March 15, 1932.  J. MILAN  1,849,584

BRAKE

Filed Aug. 19, 1929   4 Sheets-Sheet 1

Inventor

Milan

By Clarence A. O'Brien
Attorney

March 15, 1932. J. MILAN 1,849,584
BRAKE
Filed Aug. 19, 1929 4 Sheets-Sheet 4

Inventor
J. Milan

By Clarence A. O'Brien
Attorney

Patented Mar. 15, 1932

1,849,584

UNITED STATES PATENT OFFICE

JOSEPH MILAN, OF LOS ANGELES, CALIFORNIA

BRAKE

Application filed August 19, 1929. Serial No. 386,947.

This invention appertains to new and useful improvements in brakes, and more particularly to novel brakes for automobiles.

The principal object of this invention is to provide a brake of water-proof construction, to exclude the entrance of water so that there will be no freezing or slipping of the braking element.

Another important object of the invention is to provide a brake capable of mechanical and fluid operation.

Still another object of importance is to provide a brake wherein the braking elements are self-adjusting, thus eliminating the necessity of frequent adjustments such as is now required in the conventional brakes.

Another important object of the invention is to provide a brake which will be extremely positive acting in operation, and yet does not permit the braking elements to contact when the brake is not applied, thus reducing wear which would be otherwise occasioned by loosely contacting braking elements.

Other important objects and advantages of the invention reside in the durability of the device, its balanced arrangement of parts, its combination mechanical and fluid operability, and various other attainments which will become apparent to the reader during the course of the following specification and claims.

In the drawings:

Referring to the drawings, wherein like numerals designate like parts, it will be seen that Figure 3 represents a detail sectional view of one of the front brake units, while Figure 4 represents a detail sectional view through one of the rear brake units.

Figure 4:
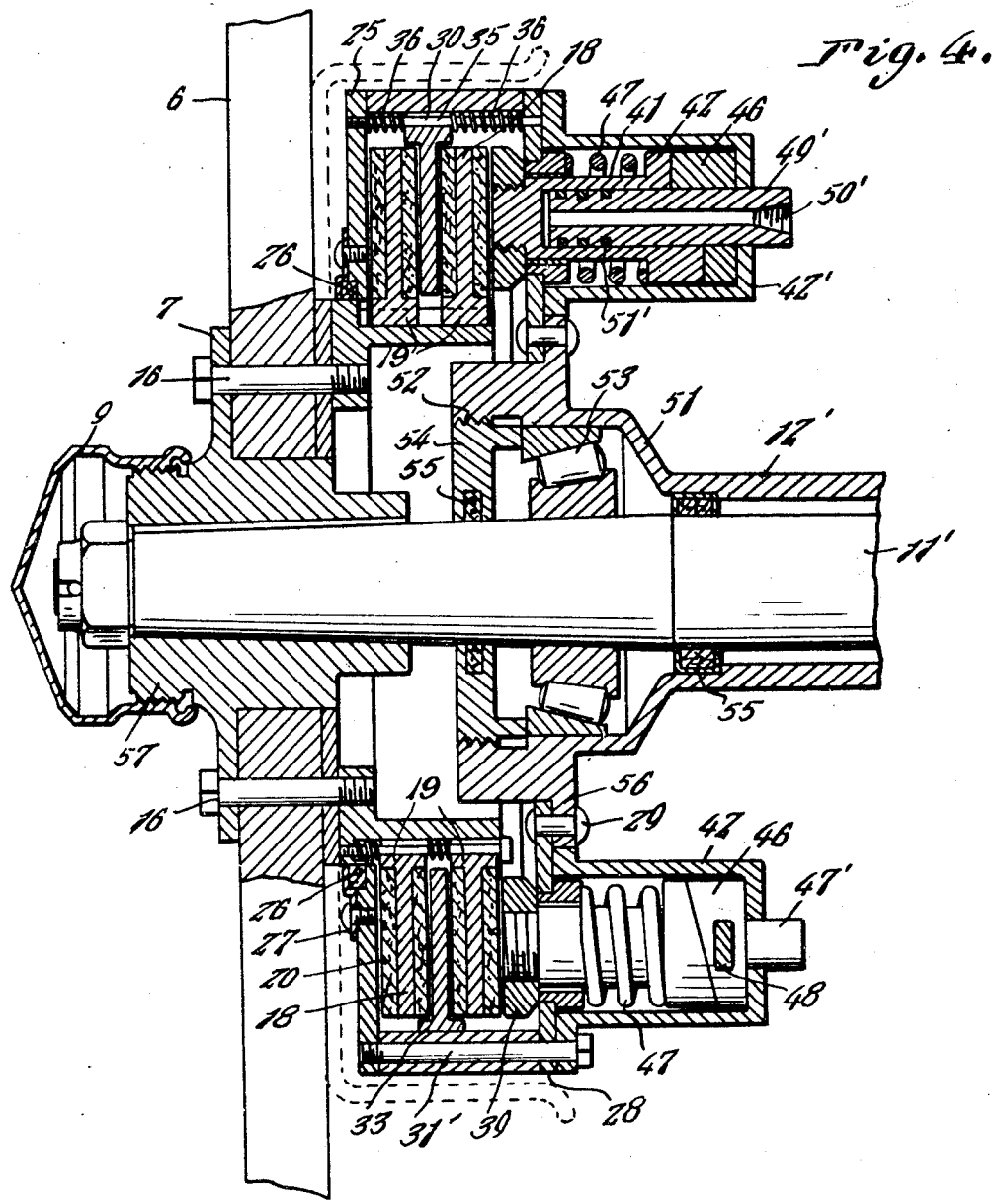
Figure 4 represents a horizontal sectional view taken substantially diametrically through the rear brake unit.

The immediate following description will be relative to the front brake unit, yet the structure shown in Figure 4 is but slightly modified to accommodate the axle housing shown therein.

The front wheel includes the hub 5 from which the spokes 6 radiate in the usual manner for connection to the felly (not shown in the drawings). The hub 5 is provided with the usual circumferentially extending flange 7 and the outer end portion of the hub which is denoted by numeral 8 is externally threaded to receive the usual cap 9. Within the inner and outer ends of the hub 5, roller bearings 10 are mounted in antifrictional relation with respect to the stub axle 11.

The inner end of the stub axle 11 merges into a circular head 12 and as shown at 13, an annular packing member is arranged around the reduced portion of the head to prevent grease from seeping from the hub 5. An annulus 14 circumscribes the inner end portion of the hub 5 while the ring 15 engages against the annulus in the manner shown. Bolts 16 extend through the flange 7 of the hub, through the spokes 6 and annulus 14 for threaded engagement within threaded openings of the aforementioned ring 15. The ring 15 is provided with a cylindrical wall 17 protruding therefrom for slidably supporting the brake element.

The brake elements include a pair of rings 18—18, which are enlarged at their inner edges as at 19 to provide shoulders against which the annular friction plates 20 may abut. There is a friction plate 20 for each side of each of the rings 18 as is clearly shown in Figure 3. The enlarged edge portion 19 of each ring 18 is provided with a plurality of slots extending transversely thereof and at predetermined positions on the periphery thereof for receiving the teeth 21 which radiate from the aforementioned cylindrical protuberance 17.

Figure 3:
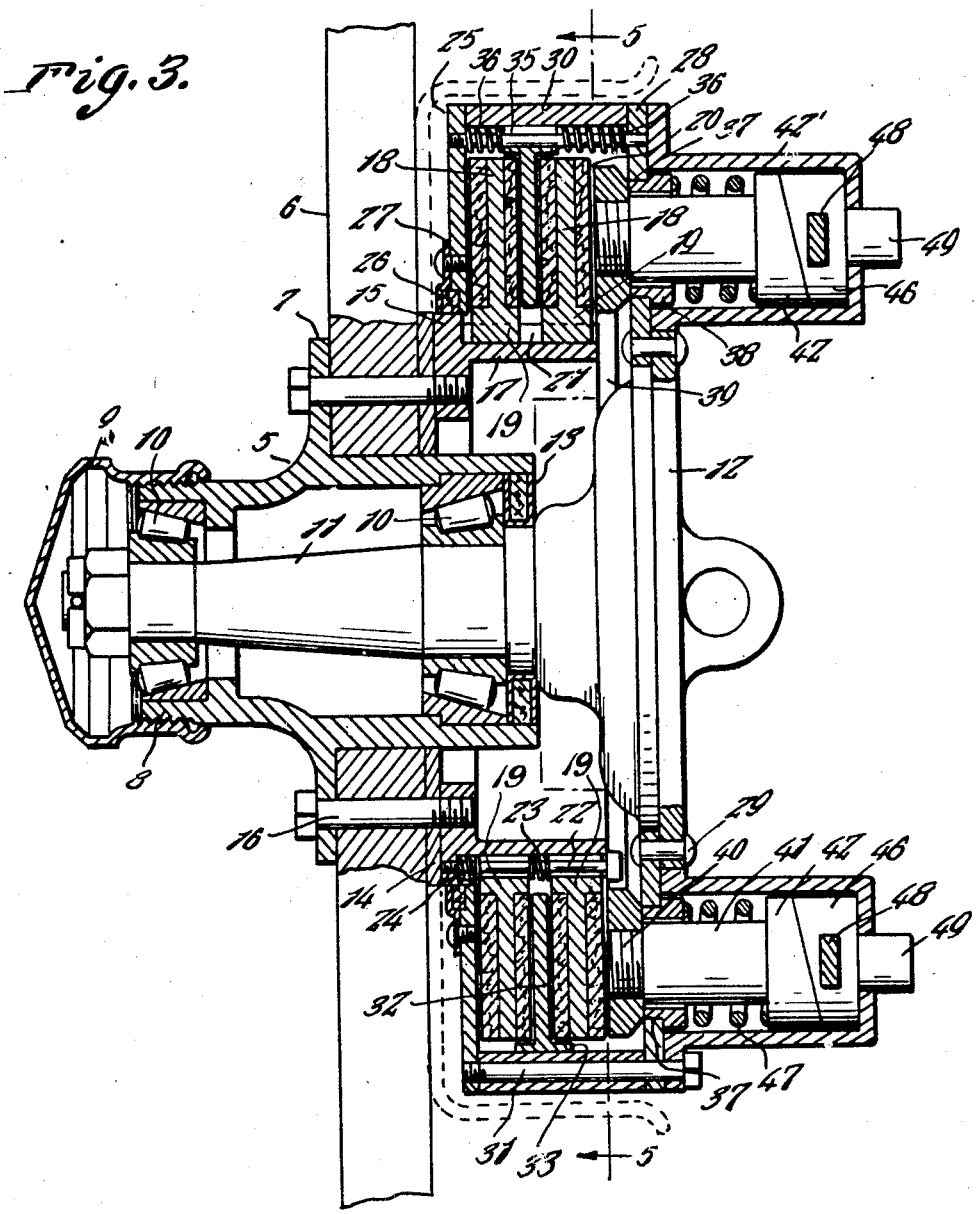
Figure 3 represents a horizontal sectional view taken substantially on line 3—3 of Figure 1.

Certain openings are provided in the enlarged portions 19 of the rings 18 for registry with the spaces between certain pairs of the teeth 21 on the cylinder 17 for the purpose of receiving an elongated pin 22, which pin extends through both of the rings 18 at their enlarged inner edge portions in substantially the manner shown in Figure 3. There may be any suitable number of these pins 22 and they are threadedly engaged within openings in the ring 15.

Interposed between the enlarged portions of the rings 18 and circumscribing each pin 22 is a compressible spring 23 and another compressible spring 24 is provided on each pin between the ring 15 and the adjacent ring 18.

A circular plate 25 has its inner edge portion reduced for receiving a packing strip 26 and a rim 27 is secured to the circular plate 25 and is bent over the packing strip 26 in the manner shown in Figure 3 to prevent displacement thereof. An annular plate 28 is arranged in parallelism with respect to the plate 25, the center portion thereof being open to receive the enlarged end portion of the stub shaft 11.

Rivets 29 are employed for securing the annulus 28 at its inner edge portion to the enlarged head 12 of the stub shaft, while a cylindrical band 30 is interposed between the outer edge portions of the plates 25 and 28. The ring 30 is provided with transversely extending bores for registry with openings in the edge portions of the plates 25 and 28 for receiving the tie bolts 31' whereby the aforementioned plates 25 and 28 are snugly clamped against the said cylindrical band.

Figure 5:
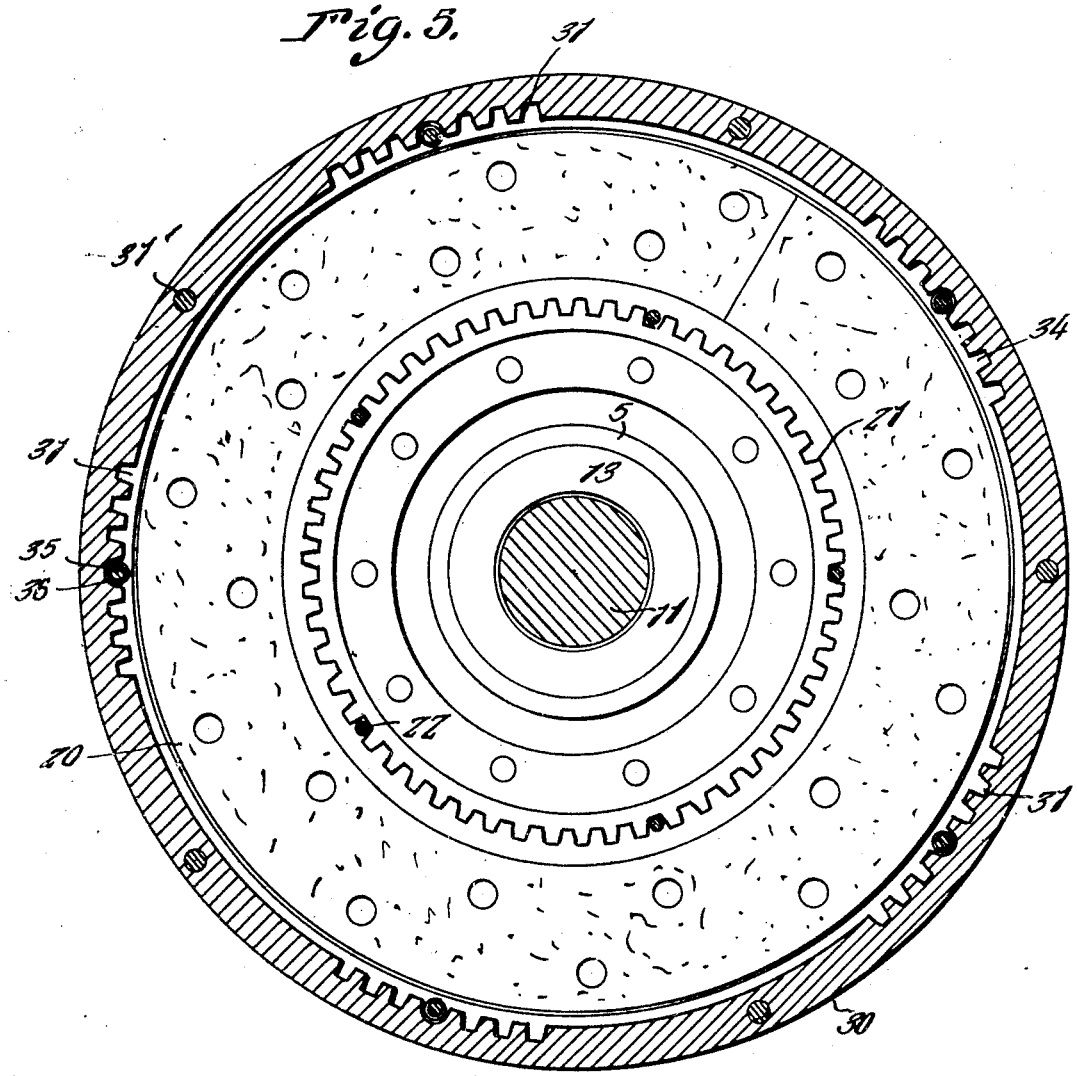
Figure 5 represents a vertical sectional view taken substantially on line 5—5 of Figure 3.
Figure 6:
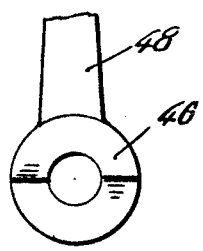
Figure 6 represents a fragmentary elevational view of one of the cam members.

As is clearly shown in Figure 5, the band is provided at predetermined points on its inner side with groups of transversely extending channels 31 and a slidable band 32 is transversely slidable within the said band 30, the said band 32 being provided with a peripheral enlargement 33 having teeth 34 thereon for mesh with the transverse channel 31 of the band 30.

This relation of the annulus 33 with respect to the band 30 permits transverse sliding movement of the said annulus within the confines of the band. Certain openings are provided transversely on the peripheral enlargement 33 for registry with certain of the channels 31 for receiving pins 35. On each pin 35, a pair of coiled springs 36—36 are arranged, the same being interposed between the plates 25 and 28 and the corresponding sides of the peripheral enlargement 33, whereby the annulus 32 may be centralized within the band.

As is shown in Figure 3, the annular plate 28 is provided with a pair of openings 37 arranged at diametrically opposite points thereon. Arranged within each of the openings 37 is a shouldered bushing 38 and a follower ring 39 is interposed between the sail annular plate 28 and the adjacent friction plate 20 on the brake element 18. The follower ring 29 is provided with threaded openings at diametrically opposite points in registry with the openings 37 and these openings serve to receive the threaded reduced ends 40 of the shank 41 extending from th cam sections 42.

Figure 1:
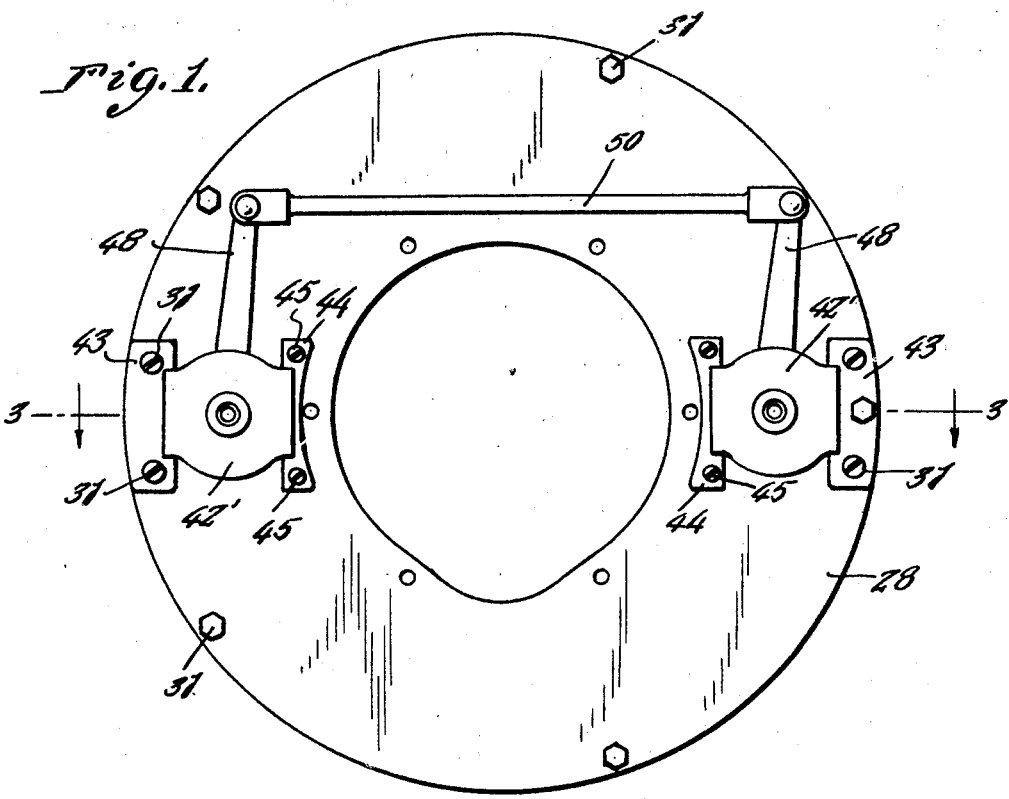
Figure 1 represents a side elevation of one of the novel brake units.
Figure 2:
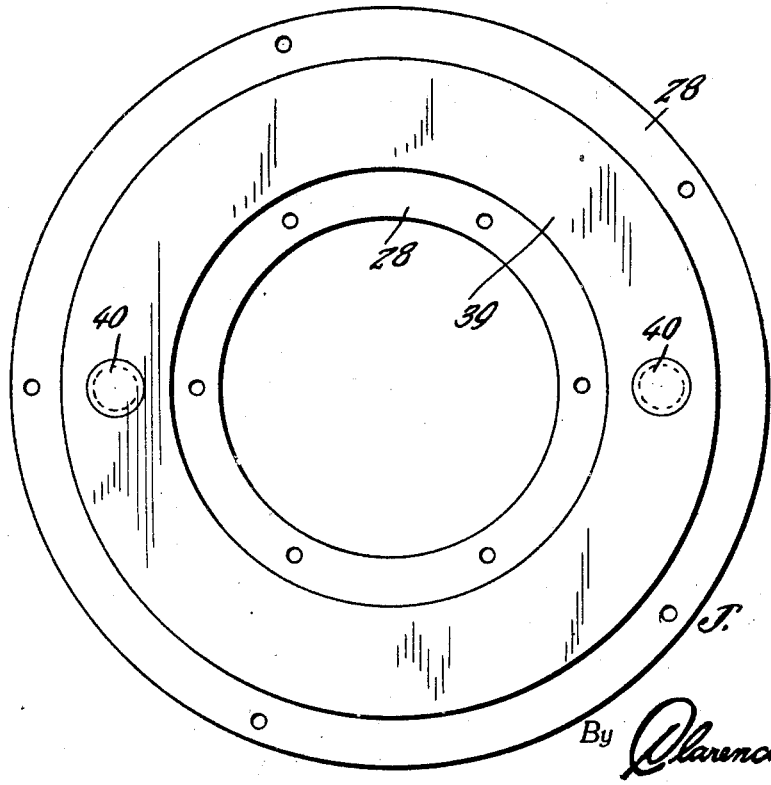
Figure 2 represents an inside elevation of the cover shown in Figure 1.

As is clearly shown in the drawings, cylindrical housings 43 are each open at one of their ends and at this end flanged at 43 and 44. (See Figure 1.) The bolts 31' serve to secure the flange 43 to the plate 28, while screw members 45 secure the flanges 44 to the said plate. These housings are arranged over the openings 37 to enclose not only the cam sections 42 but also a complementary cam section 46, which when rotated has a cam action against the section 42.

Interposed between each bushing 38 and the adjacent cam section 42 is a compressible spring 47 for maintaining the cam disposed in the manner shown in Figure 3 with the follower ring 39 spaced from the adjacent friction plates.

Each of the housings 42 has a circumferential opening therein through which the lever 48 protrudes, the same extending from the cam section 46. Each cam section 46 has a pintle extension 49 journalled through an opening in the closed end of the housing. As is clearly shown in Figure 1, a tie rod 50 connects the free ends of the levers 48, and suitable connection may be made from this tie rod to means for operating the brake at a remote point.

Figure 4, which discloses the rear brake structure only shows the invention modified to the extent whereby it may accommodate the rear axle shaft and its complementary housing. The rear axle shaft is denoted by numeral 11' while the housing is referred to by numeral 12' and the adjacent end of the housing 12' is flared as at 51 and internally threaded as at 52. The flared portion 51 is hollow to receive the roller bearing structure 53, which is interposed between the shaft 11' and the said flared portion of the axle housing. A threaded bushing plate 54 is engageable with in the threaded interior of the flared portion of the housing for retaining the bearing structure 53 against displacement, and suitable packings 55 are provided on opposite sides of the bearing structure 53 to prevent grease from seeping into the brake structure.

As is clearly shown in Figure 4, the flared portion 51 of the housing 12' is provided with a circumferentially extending flange 56 whereby the housing may be secured to the aforementioned annular plate 28 by means of the rivets 29. The hub 57 is solid excepting for the bore into which the end of the axle is keyed and the various other parts of the structure are identified in Figure 3.

It will thus be seen that this novel brake structure will be far more efficient and satisfactory in use from a mechanical standpoint than brakes now in use on automobiles used at present, and the following description sets forth how this brake is operated by fluid pressure.

As is clearly shown in Figure 4, the shank 41 projecting from the cam section 42 is made hollow to accommodate the tube 49', which at its outer end is internally threaded as at 50' to receive a suitable coupling. The tube 49' is suitably secured to the housing 42' and the inner end thereof is provided with packing rings 51'.

It will thus be seen that fluid under pressure delivered through the bore of the member 49' will act against the shank 41 to force the friction ring 39 against the adjacent brake element 18. The fluid operating means may be employed in conjunction with both the front and rear brake structures, or with the rear brake structures alone, and whether the brake is operated by fluid control or mechanically, it will be seen that when the follower ring 39 is forced against the friction plate 20 of the adjacent annulus 18, the latter annulus will be slid against the ring 32, while the ring in turn will be clamped against the friction plate of the remaining annulus 18, and as the annular brake elements 18 rotate with the wheel, the positive acting nature of these binding parts will quickly retard the motion of the vehicle.

The spring means afore described are employed for equalizing and maintaining spaced the various parts of the brake mechanism so that there will be no friction of parts when the brake is entirely disengaged.

While the foregoing description has been in detail, it is to be understood that numerous changes in the shape, size and materials may be resorted to without departing from the spirit and scope of the invention as claimed hereinafter.

Having described the invention, what is claimed as new is:

1. A wheel brake comprising a cylinder attached to a wheel and having teeth on its outer circumference, a number of circular plates having enlarged inner edges formed with notches for receiving the teeth, a ring of frictional material on each face of each plate, a stationary casing enclosing the plates and having groups of teeth on its inner circumference, a plate of ring form having a large outer edge formed with groups of teeth for engaging the teeth on the casing, rods carried by the cylinder and fastened between some of the teeth thereon and through some of the notches in the first mentioned circular plate, springs on said rod for holding the first mentioned plate in neutral position, rods carried by the casing and fastened between some of the teeth thereon and between some of the teeth of the ring shaped plate, springs on said last mentioned rod for holding the said ring shaped plate in neutral position and spaced from the friction ring carried by the first mentioned plate, housings connected with the inner face of the casing and opening into the same, a spring plunger in each housing, a follower ring attached to the inner ends of the plungers, the springs of the plungers normally holding the same plungers with the follower rings out of engagement with the adjacent friction rings, and means for forcing the plungers toward the wheel carried by the follower ring for causing the annular plate to move into clamping engagement.

2. A brake comprising a drum, a pair of annular brake elements slidably connected to the drum, a stationary housing circumscribing the drum, a slidable ring at the inside of the housing for interposition between the brake element, a cam operated plunger, a follower ring connected to the plunger and being engageable against one of said brake elements, spring means for normally maintaining the said plunger retracted, and means for operating the cam means.

In testimony whereof I affix my signature.

JOSEPH MILAN.